May 28, 1957 M. J. STEELE 2,793,847
INDUSTRIAL GAS PURIFIER
Filed Dec. 29, 1955 3 Sheets-Sheet 1

FIG·1

INVENTOR.
MARIE J. STEELE
BY Naylor + Neal
ATTORNEYS

INVENTOR.
MARIE J. STEELE
BY Naylor & Neal
ATTORNEYS

May 28, 1957 M. J. STEELE 2,793,847
INDUSTRIAL GAS PURIFIER
Filed Dec. 29, 1955 3 Sheets-Sheet 3
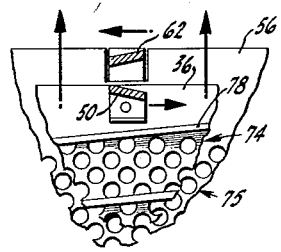
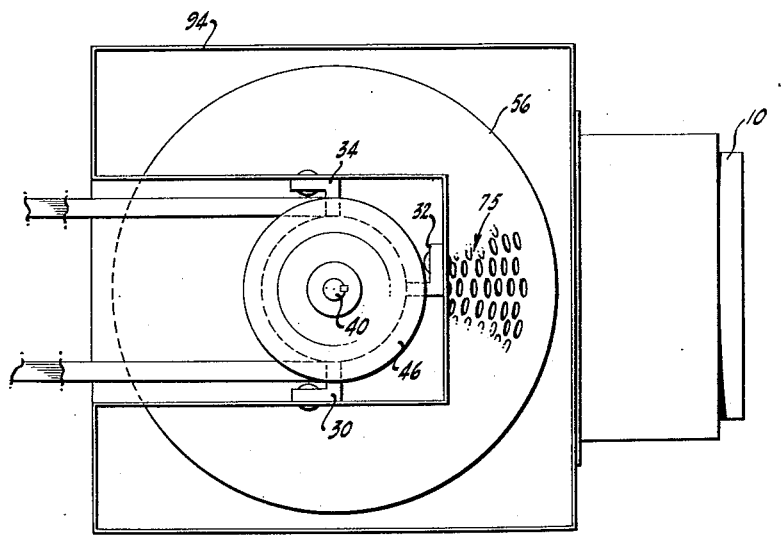
INVENTOR.
MARIE J. STEELE
BY Naylor & Neal
ATTORNEYS United States Patent Office 2,793,847
Patented May 28, 1957

2,793,847

INDUSTRIAL GAS PURIFIER

Marie J. Steele, Santa Cruz, Calif.

Application December 29, 1955, Serial No. 556,155

5 Claims. (Cl. 261—89)

This invention pertains to an industrial gas purifier, and more particularly to an apparatus for removing solid material from industrial gases.

It is many times desirable to remove solid material such as soot, industrial grinding products, dust, and radioactive material from industrial gases and air. Such solid materials thrown into the air create public and private nuisances, destroy the desirability of the industrial site, and create a health hazard.

The device contemplated by this invention is a new and improved highly efficient industrial gas purifier, scrubber or scavenger machine adapted to remove solid material from gaseous products by thoroughly mixing a liquid washing agent, such as water with the gas whereby the washing agent surrounds solid particles and carries them downward as a sludge to be removed from a sump at the bottom of the machine. In this specification, wherever water is mentioned, other liquid washing agents can be used. Water, of course, is the most abundant washing agent.

This invention depends in part upon a new and improved liquid and gas mixing arrangement in combination with a novel means for forcing liquid into engagement with the gas to form a sludge.

It is therefore an object of this invention to provide a novel industrial gas purifier.

It is another object of this invention to provide means for removing solid particles from gaseous products.

It is still another object of this invention to provide a novel means for scrubbing industrial gases to remove solid materials therefrom.

It is a more particular object of this invention to provide two counter-rotating perforated conical members combined with helical means and a spray of liquid washing agent as an industrial gas purifier.

Other objects will become apparent from the following description taken in connection with the accompanying drawings in which:

Figure 4 is a view taken at 4—4 in Figure 1; and

Figure 5 is a view taken at 5—5 in Figure 1.

Figure 1:
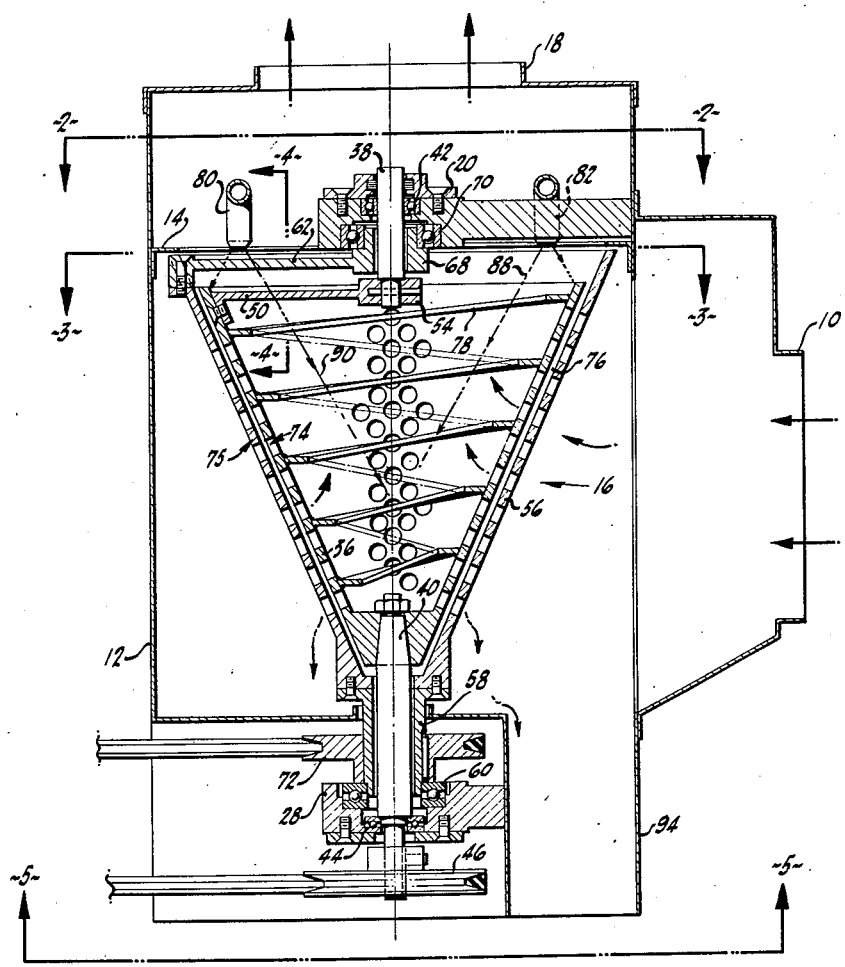
Figure 1 is a view, partially in section, of the industrial gas purifier of this invention.

In the figures, industrial gases enter through means forming conduit 10 into means forming a chamber 12. Industrial gases cannot leave chamber 12 because of baffle 14, shown more particularly in Figures 2 and 3, but is forced through the air purifier of this invention, shown generally at 16, and escapes through means forming conduit 18. The air purifier of this invention, shown generally at 16, is mounted for rotation relative to bearing housings 20 and 28. Bearing housing 20 is supported relative to chamber 12 upon struts 22, 24 and 26, shown more particularly in Figure 2. Housing 28 is supported relative to chamber 12 by means of support members 30, 32 and 34 shown more particularly in Figure 5.

Inner cone 36 is mounted for rotation upon shafts 38 and 40. Shaft 38 is mounted to rotate in bearing 42 while shaft 40 is mounted to rotate in bearing 44. Pulley 46 is keyed to shaft 40 and is connected to motive means (not shown) to be turned thereby. Spider arms 48, 50 and 52 connect the periphery of cone 36 at the top and hub 54. Shaft 38 is keyed to hub 54.

Outer cone 56 is mounted upon hollow shaft 58 which has clearance along its axis to allow free rotation of shaft 40. Hollow shaft 58 is mounted for rotation relative to bearing housing 28 upon bearings 60. The upper portion of outer conical member 56 is connected by spider members 62, 64 and 66, shown more particularly in Figures 2 and 3, to hub 68 which is mounted for rotation relative to bearing housing 20 upon bearing 70. Hub 68 has clearance along its axis to allow free rotation of shaft 38. Pulley 72 is keyed to shaft 58 and is connected to a source of motive power (not shown). The motive power adapted to turn pulley 72 turns pulley 72 in a direction counter to the direction of rotation of pulley 46. Obviously shafts 58 and 40 can be driven by other motive members such as a gear train (not shown).

Attention is now directed to the structure of inner cone 36 and outer cone 56. Conical members 36 and 56 are concentric, hollow, rotatable conical members. Each conical member 36 and 56 has its wall perforated by a plurality of relatively small holes shown generally at 74 and 75, shown in detail in Figure 4. Although it is preferred to have cones 36 and 56 rotate concentrically, it is clear from the figures that a slight mis-alignment of the axes of the two cones would merely decrease the efficiency of the purifier. The apex angle of each of conical members 36 and 56 is preferably identical to the apex angle of the other to cause the sides of members 36 and 56 to be parallel to each other. Perforations 74 and 75 in members 36 and 56 respectively are preferably adapted to be aligned in the two members. Clearance is provided between members 36 and 56, as shown at 76, to allow complete mixing between water supplied to the interior of cone 36 as described hereinafter, and industrial gases entering through conduit 10.

A helical member 78 is attached to the inner wall of inner conical member 36. The general shape of the curve formed by shelf or vane 78 is a conical helix. Helical vane 78 is spiraled about the interior of member 36 in a direction with respect to the direction of rotation of member 36 to force water in a downward direction. Ordinarily water sprayed into the interior of a rotating cone tends to move in an outward direction due to its own inertia. Because of the slope of the wall of the cone, there is a component of velocity upward along the wall of the cone. This upward component of velocity is countered by helical vane 78, and further the motion of vane 78 relative to the water forces the water in a downward direction. To that end, the slope of the surface of vane 78 from the wall of cone 36 toward the axis of cone 36 is preferably maintained perpendicular to the axis of conical member 36 as shown in Figure 1 although slight deviation from this position will not cause too much difficulty if shelf 78 is sloped in a downward direction. If member 78 is to deviate from a position perpendicular to the axis of cone 36, it is preferable that it be sloped from the wall of cone 36 in a slightly downward direction rather than in an upward direction to completely counter upward velocity of the water.

Figure 2:
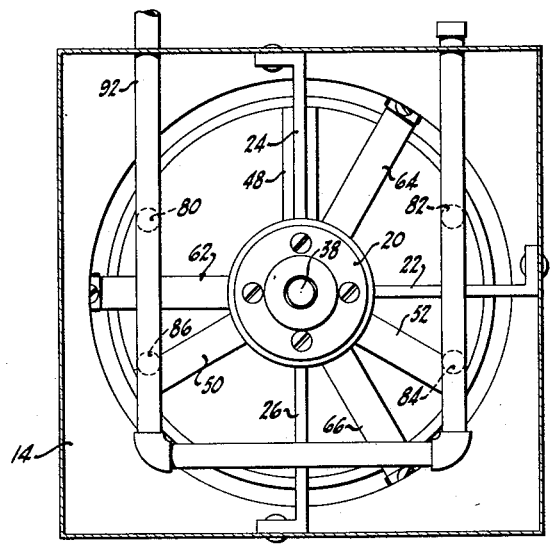
Figure 2 is a view taken at 2—2 in Figure 1.

Water is sprayed into conical member 36 from nozzles 80, 82, 84 and 86 as shown in Figures 1 and 2. Nozzles 80, 82, 84 and 86 are preferably positioned relative to cone 36 to supply a copious amount of water to the entire inner surface of conical member 36, as shown by dotted lines 88 and 90 in Figure 1.

Water is supplied to nozzles 80, 82, 84 and 86 through water pipe 92, as shown in Figure 2. Spider members 62, 64 and 66 which support cone 56; and spider members 48, 50 and 52 which support cone 36 are shown clearly in Figure 2.

Figure 3:
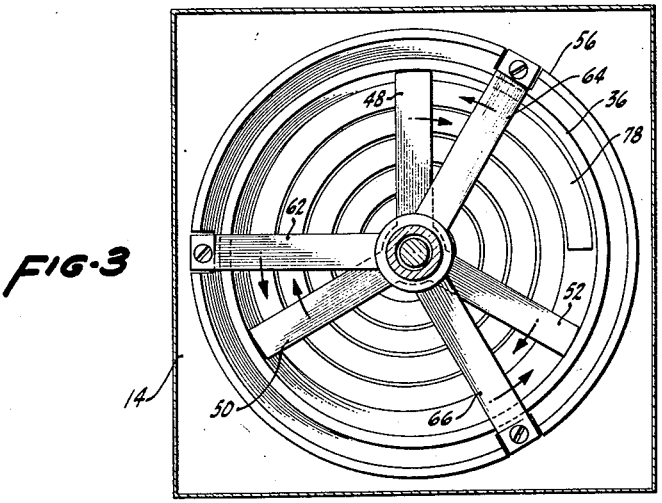
Figure 3 is a view taken at 3—3 in Figure 1.

The inner surface of conical member 36, together with helical vane 78, as seen from the top, is shown more particularly in Figure 3.

Figure 4 shows a detailed fragment of conical members 36 and 56 particularly showing the grid of the plurality of perforations 74 and 75 in conical members 36 and 56.

Figure 5 completes the picture by showing a bottom view of the gas purifier of this invention, including the outline of sludge sump 94.

In operation, water is sprayed from nozzles 80, 82, 84 and 86 into the interior of conical member 36. Conical members 36 and 56 are caused to rotate upon their bearings in counter-rotating directions. Helical vane 78 forces water sprayed on the inner surface of conical member 36 downward along the inner surface of member 36, part of the water being continuously forced outward through perforations 74 in a spray into space 76 thence through perforations 75 into sump 94.

Industrial gases entering chamber 12 through conduit 10 are forced by baffle 14 to pass through perforations 75 in conical member 56 into spaces 76 between conical members 36 and 56 where the gases are thoroughly mixed with water. The water removes solid material from the gases and is forced outward through the perforations 75 by centrifugal action and flows freely into sump 94. The washed gases pass through perforations 74 into the interior of conical member 36 and thence upward and outward through conduit 18.

The support members for the two cones comprising spider arms 48, 50 and 52 and integrated hub 54 and spider arms 62, 64 and 66 and integrated hub 68 offer but a minor degree of impedance to the flow through said cones and to the outlet opening 18 of gas introduced into said housing through the inlet opening 10. Since the latter opening is disposed at a level substantially entirely above the support means within the chamber 12 for the lower ends of the cones, said support means offers no resistance to the flow of the gas through the cones and out of the outlet opening 18.

The slope of the cones allows sludge to fall freely and causes water to be forced against the helical member which cooperates to evenly distribute the water and force the sludge to the bottom of the cones and out of the perforations.

The device of this invention comprises an efficient gas purifier adapted to thoroughly mix incoming gases with water and to remove solid materials from the gases with the water, leaving the clean purified gases free to escape through an outlet from the purifier.

Although a particular embodiment of the gas purifier of this invention has been shown and described, it is not intended that the invention should be limited by the particular species described but only by the scope and spirit of the appended claims wherein I claim:

1. In an air purifier: an upper and lower bearing housing each adapted to support for rotation inner and outer separately rotatable concentric shafts; an outer hollow cone having a perforated wall, a spider attached to the open end thereof, said cone being mounted with its apex at the bottom and being attached to said outer shaft for rotation therewith; an inner hollow cone having a perforated wall, a second spider attached to the open end thereof, said inner cone having an apex angle identical to that of said outer cone, said inner cone being mounted within and concentric to said outer cone with its apex at the bottom and attached to said inner shaft for rotation therewith; means for applying liquid washing agent to said inner cone; a helical vane spiraled along the wall of said inner cone in the general shape of a conical helix and sloped to force washing agent in a downward direction; means for rotating said inner cone in a direction relative to the direction of spiral of said helical vane to cause washing agent applied to said inner cone to be forced downward; and means for rotating said outer cone counter to rotation of said inner cone.

2. In combination, a first hollow inner cone having a perforated wall and having affixed to the inside surface thereof a vane spiraled in the general shape of a conical helix, said vane being substantially normal to the longitudinal axis of said cone, means rotatably supporting said cone with its apex disposed downwardly and with its longitudinal axis disposed vertically, a second hollow outer cone having a perforated wall and having an apex angle corresponding to that of said first cone, means rotatably supporting said second cone in closely spaced concentric relation with said first cone, and drive means connected to said rotational support means for said cones operable to rotatably drive said cones in opposite directions of rotation.

3. The combination of claim 2 further including a housing enclosing said cones and defining a gas conduit having an inlet opening positioned to direct gas at the peripheral surface of said second cone and having an outlet opening disposed above said cones, and at least one liquid dispensing nozzle mounted within said housing above said cones and operable to direct a gas-washing liquid downwardly into said first cone.

4. The combination of claim 3, said means rotatably supporting said cones being disposed at both ends of said cones, with said support means disposed at the upper ends of said cones being so formed as to offer but a minor degree of impedance to the flow through said cones and to said outlet opening of gas introduced into said housing through said inlet opening.

5. In combination, a first hollow inner cone, having a perforated wall, means rotatably supporting said cone with its apex disposed downwardly and with its longitudinal axis disposed vertically, a second hollow outer cone having a perforated wall and having an apex angle corresponding to that of said first cone, means rotatably supporting said second cone in closely spaced concentric relation with said first cone, drive means connected to said rotational support means for said cones operable to rotatably drive said cones in opposite directions of rotation, a housing enclosing said cones and defining a gas conduit having an inlet opening positioned to direct gas at the peripheral surface of said second cone and having an outlet opening disposed above said cones, and at least one liquid dispensing nozzle mounted within said housing above said cones and operable to direct a gas-washing liquid downwardly into said first cone.

References Cited in the file of this patent

UNITED STATES PATENTS

| | | |
|---|---|---|
| 224,406 | Duhem | Feb. 10, 1880 |
| 300,715 | Leas et al. | June 17, 1884 |
| 1,565,002 | Behr | Dec. 8, 1925 |
| 1,759,144 | Van Ness | May 20, 1930 |

FOREIGN PATENTS

| | | |
|---|---|---|
| 387,556 | Germany | Dec. 29, 1923 |